Oct. 10, 1933.　　　J. G. BENTLEY　　　1,930,074
MEANS OF HANDLING WEB ROLLS
Filed Jan. 20, 1931　　　9 Sheets-Sheet 1
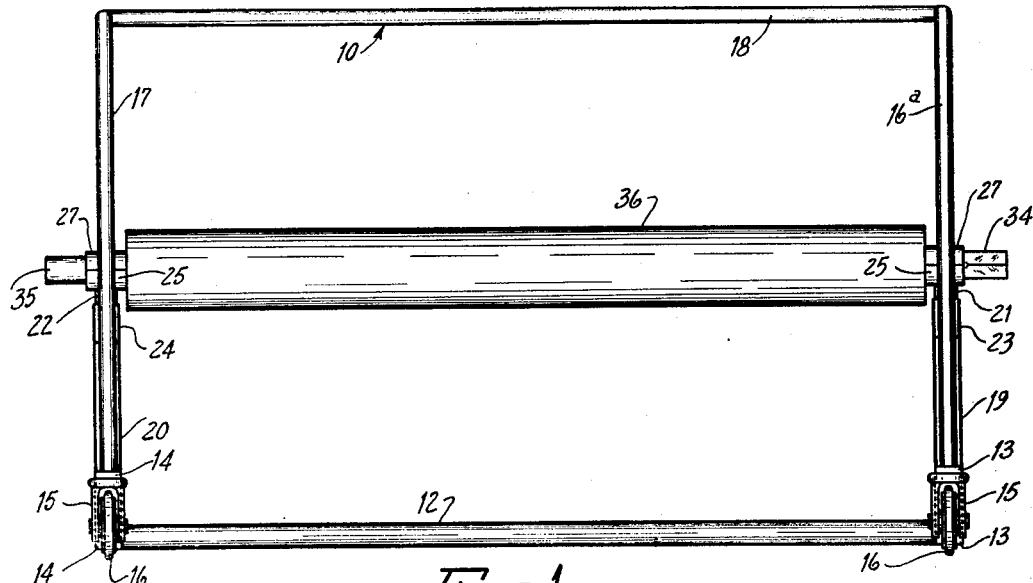
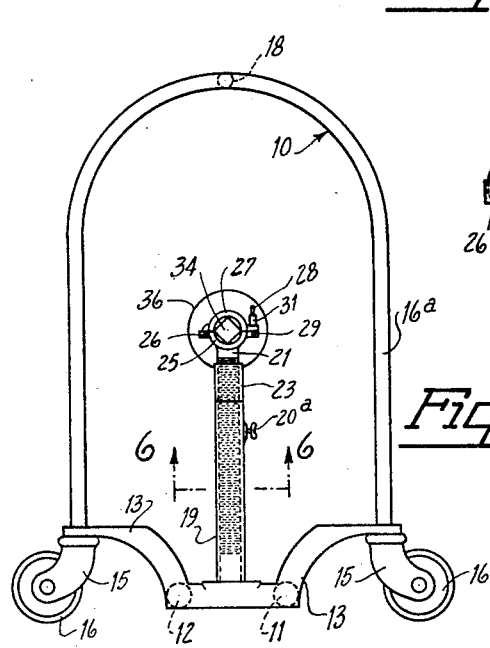
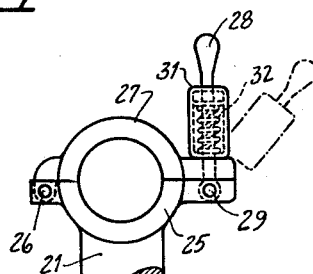
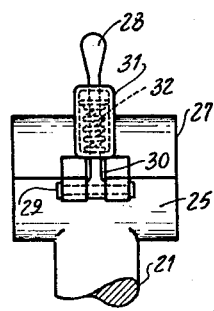
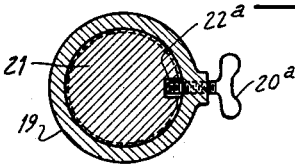
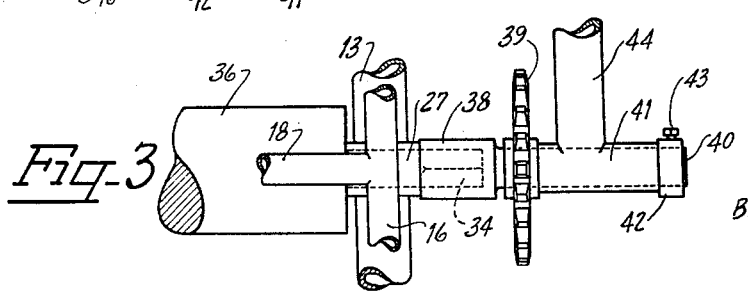
J. G. BENTLEY
INVENTOR
BY Paul H Eaton
ATTORNEY.

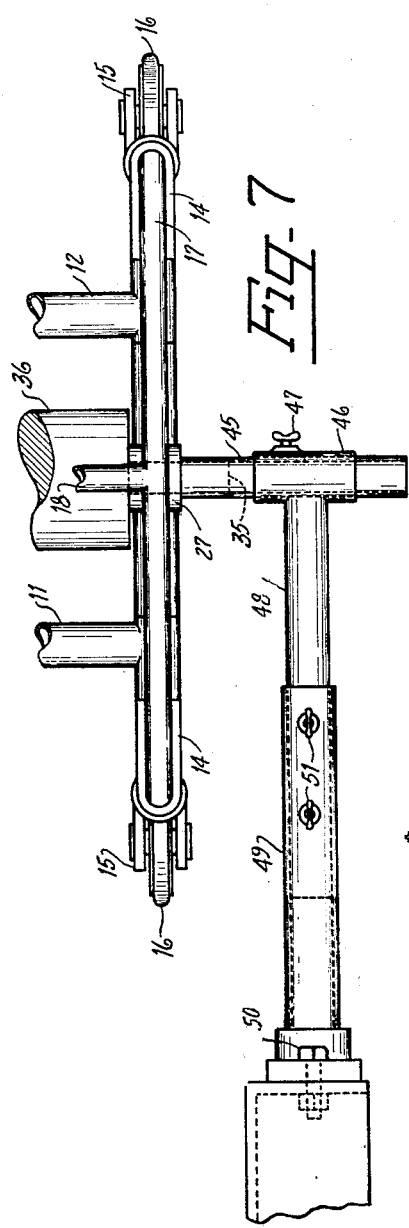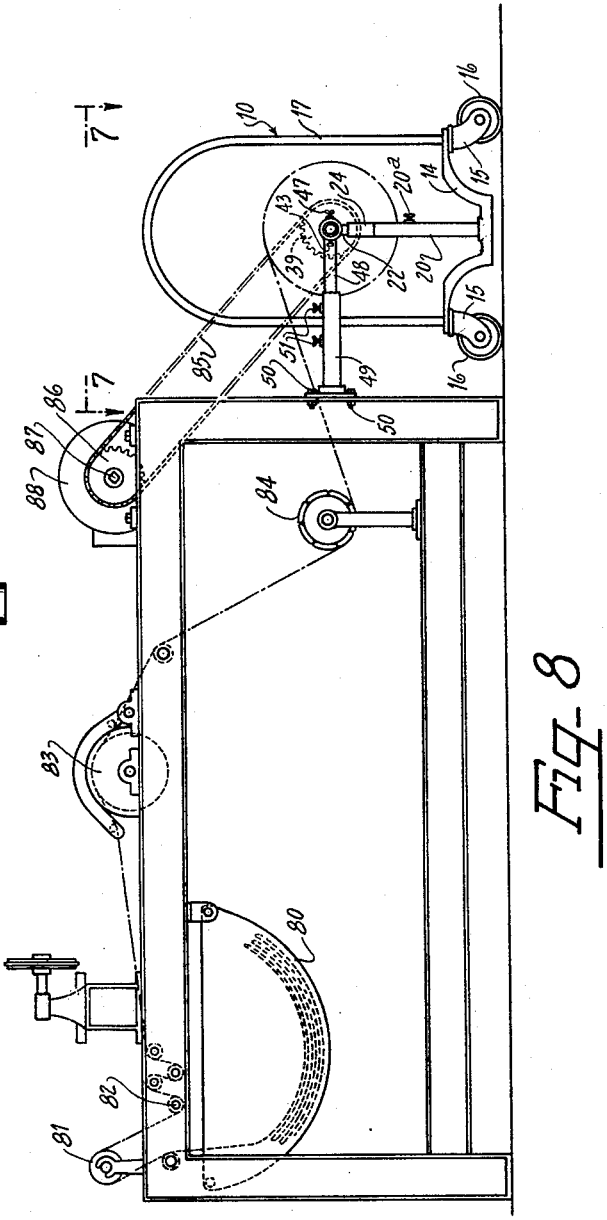

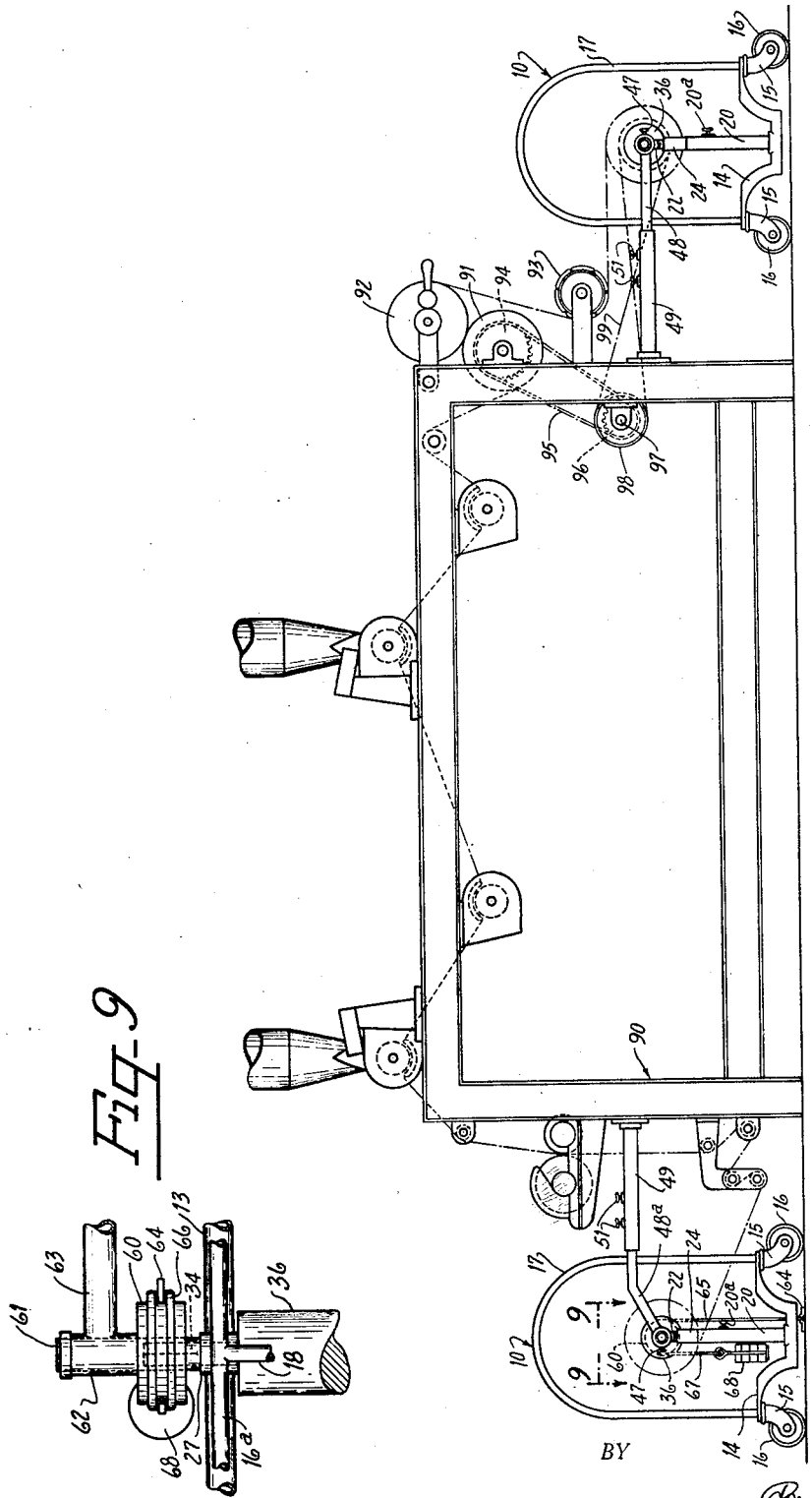

Oct. 10, 1933.  J. G. BENTLEY  1,930,074
MEANS OF HANDLING WEB ROLLS
Filed Jan. 20, 1931  9 Sheets-Sheet 4
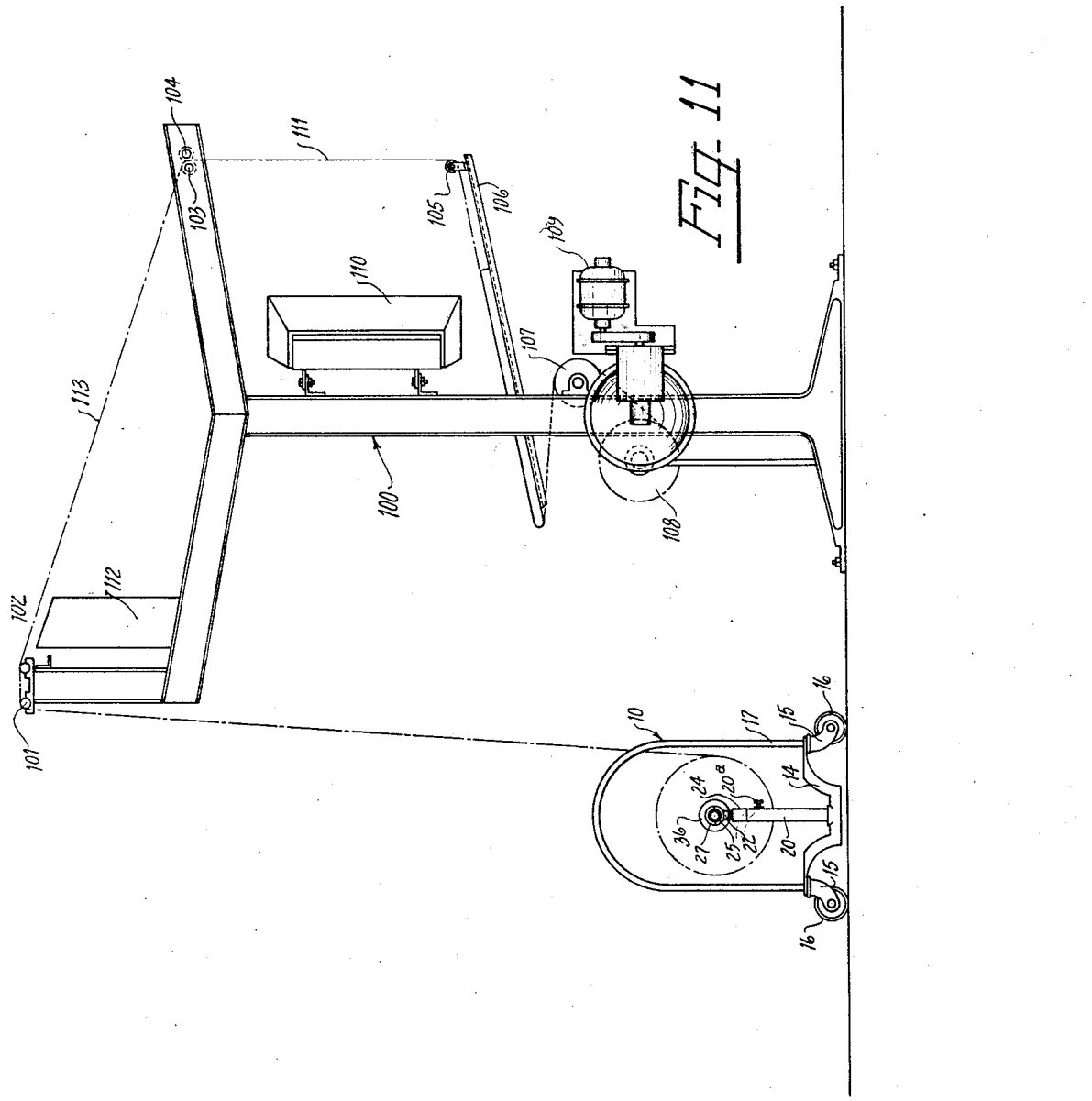
J. G. BENTLEY
INVENTOR
BY
*Paul S Eaton*
ATTORNEY.

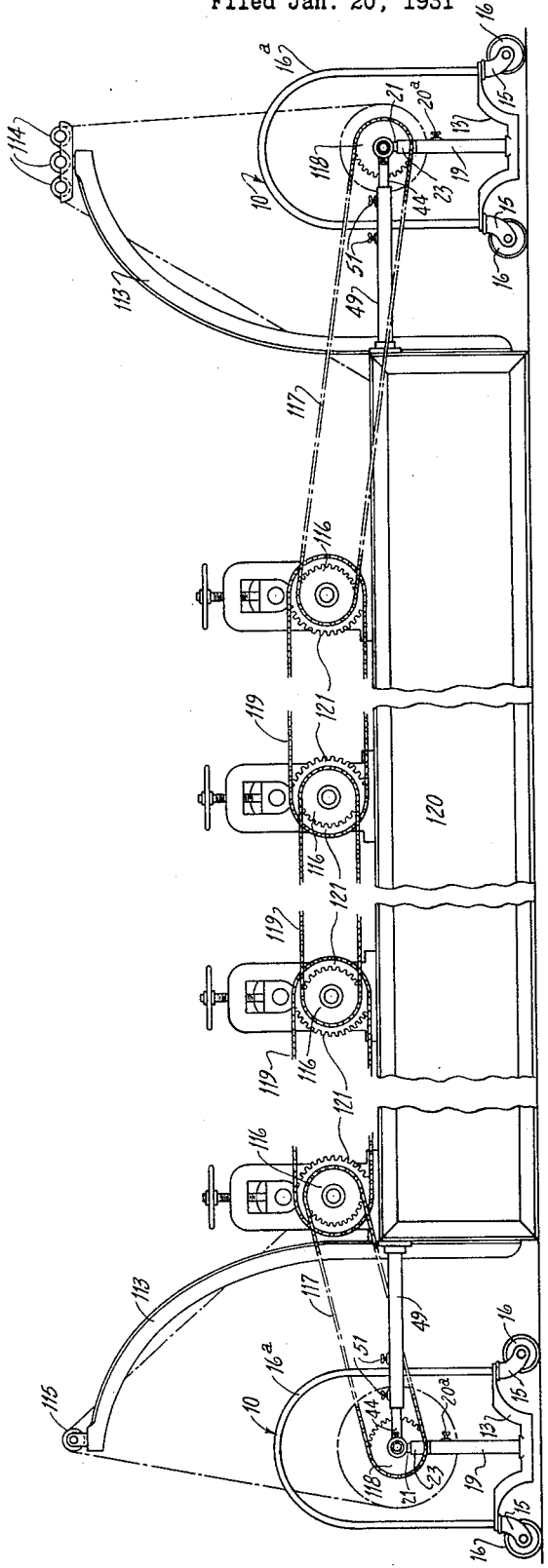

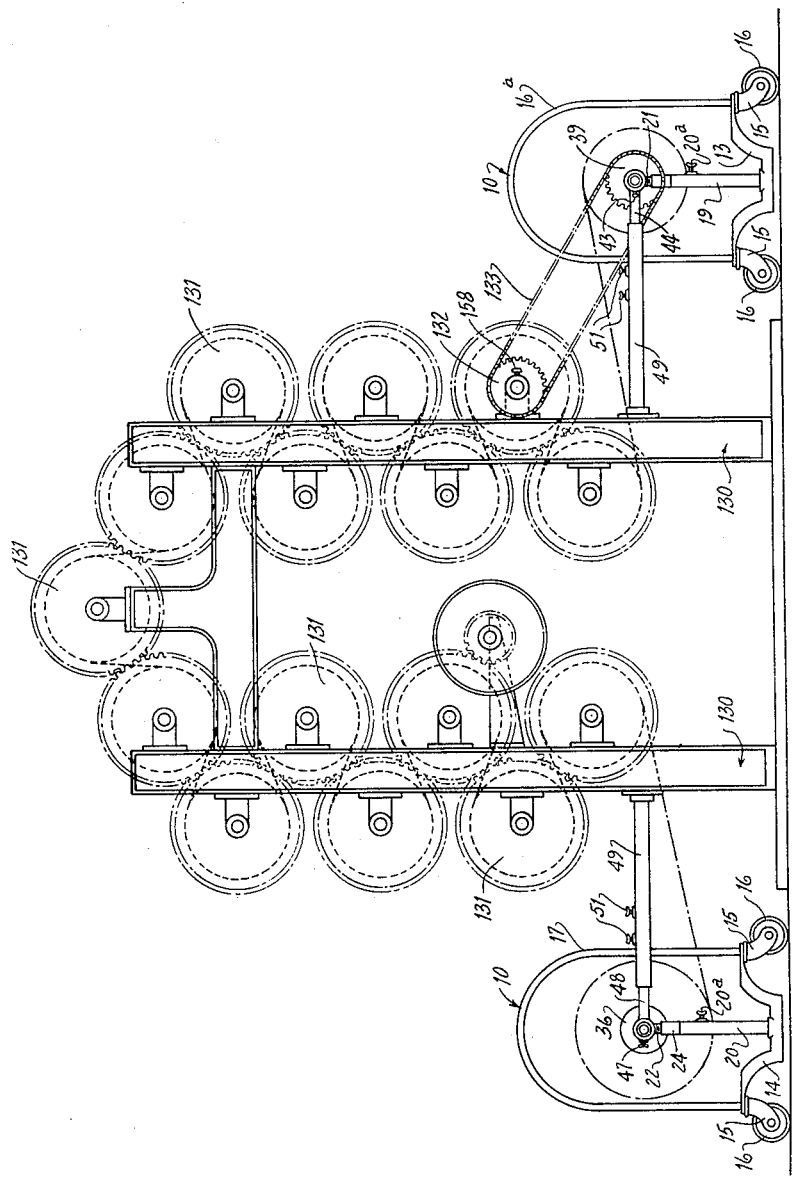

Oct. 10, 1933.  J. G. BENTLEY  1,930,074
MEANS OF HANDLING WEB ROLLS
Filed Jan. 20, 1931   9 Sheets-Sheet 7
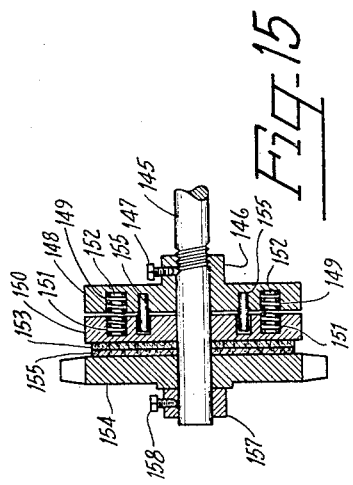
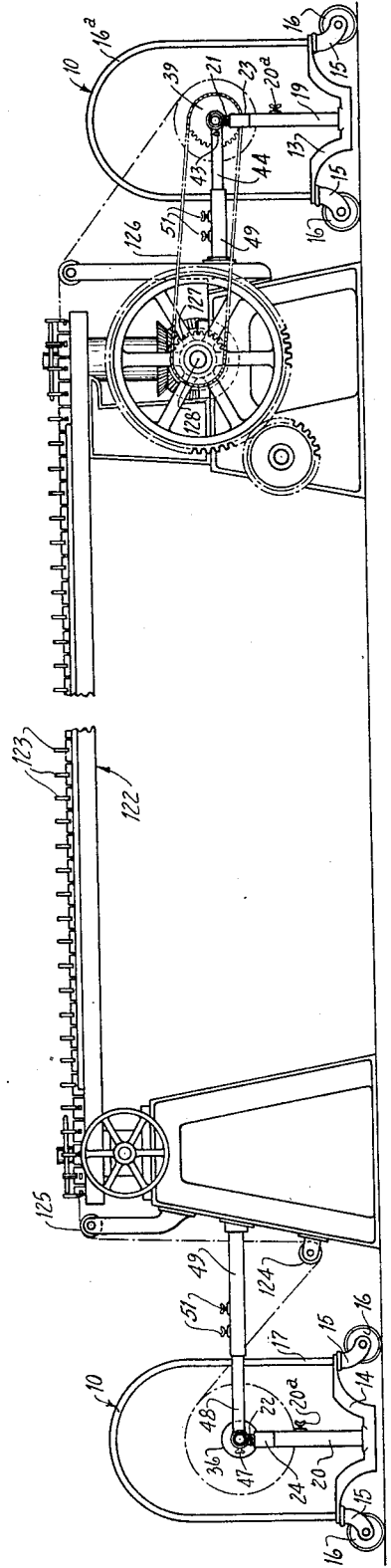
J. G. BENTLEY.
INVENTOR
BY
ATTORNEY.

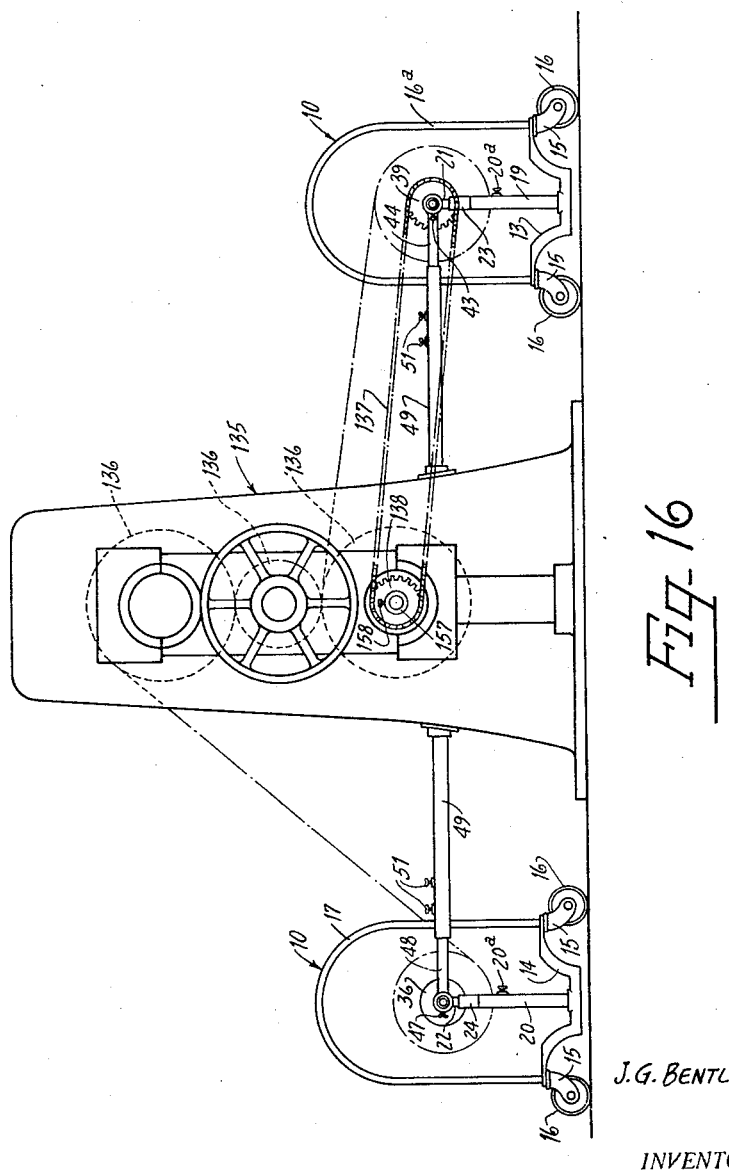

Oct. 10, 1933. J. G. BENTLEY 1,930,074
MEANS OF HANDLING WEB ROLLS
Filed Jan. 20, 1931 9 Sheets-Sheet 9
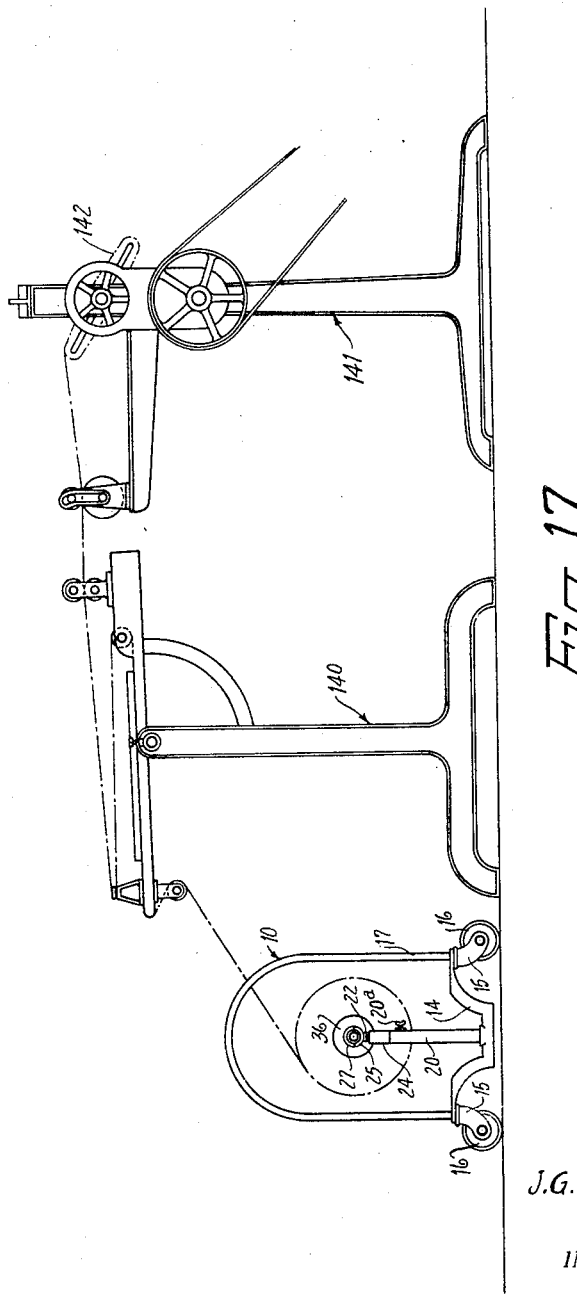
J.G. BENTLEY
INVENTOR
BY
ATTORNEY.

Patented Oct. 10, 1933

1,930,074

UNITED STATES PATENT OFFICE 1,930,074

MEANS OF HANDLING WEB ROLLS

John G. Bentley, Greensboro, N. C.

Application January 20, 1931. Serial No. 510,048

12 Claims. (Cl. 242—58)

This invention relates to methods and means of handling cloth in the textile industry during the various operations to which it is subjected for treatment before being placed in final packages for sale, and relates more especially to a truck onto which the cloth is adapted to be wound from one machine, and this truck is provided with wheels whereby the said truck can be transferred together with its roll of cloth to the feed end of the next succeeding machine through which the cloth is passed with a similar truck at the take up end of the machine with means for driving the roll in the truck located at the take up end so that the cloth can be passed from one machine to another without the necessity of handling the rolls of cloth and also keeping said rolls of cloth free from becoming soiled or otherwise damaged by coming in contact with the floor or conveying devices which are used in ordinary practice in textile mills at this time.

An object of this invention is to provide a wheeled truck adapted to be placed at either the feed end or the take up end of textile machine through which cloth is passed so that the cloth together with its associated truck on which it is wound can be transferred from the take up end of one machine to the feed end of the next succeeding machine used in the treatment of the cloth and on down through the entire line of treating cloth not only in the mill where the cloth is woven and treated, but also in dye houses and in fact, any place where cloth is treated, such as by use associated with a shearing machine, a beamer, a cloth inspector, inspecting and measuring machine, jig dyeing machine, tentering machine, drier, finishing machine, palmer or button breaker, calender, doubling and measuring machine, printing machine, and, in fact, in any machine in which cloth is treated in any manner.

In the drawings associated herewith and forming a part of this application there has been shown a truck associated with various types of textile machines in order to show the applicability of said trucks for use with any machines by the provision of suitable attaching means and suitable driving means for the feed end and take up end respectively of any machine for treating cloth in any manner.

Some of the objects of the invention having been stated other objects will appear as the description proceeds when taken in connection with the accompanying drawings in which—

Figure 1 is a side elevation of the truck;

Figure 2 is an end view, looking from the right-hand end to the left, in Figure 1;

Figure 3 is an enlarged detailed plan view of the right-hand of Figure 1, and showing the driving mechanism associated therewith;

Figure 4 is a side elevation of the means for quickly detaching the roll from the truck;

Figure 5 is a side elevation of Figure 4, taken from the right-hand side of Figure 4 and looking to the left;

Figure 6 is an enlarged cross-sectional view taken along the line 6—6 in Figure 2.

Figure 7 is an enlarged detailed plan view of the left-hand end of Figure 1 and showing the means for securing the same to a cloth treating machine.

Figure 8 is a side elevation of a beamer, showing the truck associated with the take up end of said beamer;

Figure 9 is an enlarged detailed plan view of the friction mechanism associated with one end of the truck when used as at the feed end of a machine;

Figure 10 is a side elevation of a shearer showing the trucks attached to the feed end and the take up end;

Figure 11 is a side elevation of a cloth inspector with the truck being associated with the feed end thereof;

Figure 12 is a side elevation of a dyeing machine showing the truck associated with both ends thereof;

Figure 13 is a side elevation of a dryer showing the truck associated with both ends thereof;

Figure 14 is a side elevation of a tentering machine showing the truck associated with both ends thereof;

Figure 15 is a longitudinal vertical section of a friction clutch associated with some of the machines for driving the roll in the truck;

Figure 16 is a side elevation of a calender with trucks associated with both ends thereof;

Figure 17 is a side elevation of a doubling, winding and measuring machine, showing the truck associated with one end thereof.

Referring more specifically to the drawings the numeral 10 indicates the truck as a whole which truck is composed of the two longitudinally disposed base members 11 and 12 which are welded or otherwise secured to the end members 13 and 14. Secured to the end portions of the members 13 and 14 are the casters 15 in which wheels 16 are rotatably mounted. Secured to the top of members 13 and 14 are the inverted U-shaped end members 16a and 17 which are joined together at their top portions by means of a pipe or rod 18 being welded thereto. Secured to the central and lowermost portions of the members 13 and 14 and on the upper side thereof are the upstanding pipes 19 and 20 which have loosely mounted therein the threaded supports 21 and 22 and threadably engaging these members 21 and 22 are the collars 23 and 24 whose lower ends rest on the upper ends of the members 19 and 20. The upper ends of these members 21 and 22 have the semi-circular bearing portions 25 to which is pivotally secured as at 26 the other one-half of said bearing member 27 which is adapted to be secured to the other half of the bearing portion 25 by means of a latch 28 being pivoted in member 25 as at 29 and engaging a slot 30 in member 27 with the portion 31 resiliently supported on member 28 by means of a compression spring 32 so as to hold the two bearing portions together to confine in a rotatable manner the spindles 34 and 35 of the roller member 36, said spindles 34 and 35 being secured in the ends of said roll member 36, or if desired they can be joined together to form one continuous shaft.

The spindle 34 is squared at its end and is adapted to fit into the squared opening in the member 38 which member 38 has integral therewith or secured thereon a sprocket 39 with said sprocket being integral with a bearing member 40 which is rotatably mounted in the bearing 41 with a collar 42 secured thereon by means of a set screw 43 to confine the member 38 and its associated spindle 40 in the bearing portion 41. Projecting from the portion 41 is a supporting member 44 which is adapted to be secured to the take up end of any suitable machine hereinafter described and the sprocket 39 is adapted to have mounted thereon a suitable sprocket chain, which is also adapted to be mounted on a suitable sprocket in the machine with which it is associated for driving the same to pull the cloth through the machine.

If desired, a pulley can be used instead of the sprocket 39 as either a sprocket connection or a belt connection can be used.

At the other end of the roll 36 and associated with spindle 35 a latch arrangement such as shown in Figures 4 and 5 is used for quick detachability of the roll from the truck. The spindle 35 is adapted to be supported at this end by means of a pipe 45 which pipe pierces a member 46 with a set screw 47 therein for engaging the pipe 45 so that pipe 45 can be slid away from over the ends of spindle 35 to allow the truck to be removed from any associated machine. The member 46 has a projection 48 integral therewith which fits into a pipe 49 which is secured by any suitable means such as bolts 50 to the frame work of the machine at either end thereof and set screws 51 or any other suitable means can be employed for adjusting the distance of the truck from the machine.

In Figure 6, I have shown the shaft 21 encased in the pipe 19 with set screw 20a for securing the member 21 in adjusted position, said set screw working in a vertical groove 22a in the shaft 21.

In Figure 3, there has been shown and described the mechanism associated with the end of shaft 34 which shaft is similar to the pipes or shafts 48 shown and described in the other views and a similar method of attachment to the machine such as is shown by the reference character 49 in the other views is employed. In Figure 7 the other end for supporting the truck has been shown and described. For the feed end of the various machines members 48 and 49 and associated parts are also used for one side, and for the other side the support for the truck is shown in Figure 9 wherein the squared portion 34 enters a member which has an enlarged portion or pulley 60 is employed, having a double groove therein and integral with this pulley 60 is a shaft 61 which passes through the bearing 62 on the end of pipe 63 which is similar to the pipe 48 shown in the other drawings, and a squared opening is provided in the center of this pulley 60 for receiving the squared end 34 of the spindle at one end of the roller 36. Secured to the floor is a bracket 64 and a cord 65 is secured to this bracket and is secured in turn to an endless belt 66, and to the other end of this endless belt is secured a cord 67 to which is secured a plurality of weights 68 to form a friction member by means of the belt 66 slidably and frictionally resting in the grooves of said pulley so as to exert a proper amount of friction on the roll when the truck is placed in the feed position with any of the machines shown in the drawings.

In Figure 8 the cloth in folded condition is brought from the loom or a folding machine and is deposited in a hopper 80 and is then passed through rolls 81, 82, 83 and under a cloth stretcher 84 and led on to the roll in the truck, and the sprocket chain or belt 85 is secured on sprocket wheel 39 or if the sprocket wheel 39 should be in the form of a pulley, it would pass over this pulley and pass over a driving member 86 secured to the shaft 87 which emerges from housing 88 and it will be noted that this shaft 87 has a squared opening therein which formerly received the take up roll for the shearing machine, but by the use of the truck the drive is transmitted from this part of the machine by means of the sprocket wheel 86 to the sprocket 39 on the bracket associated with the truck so that the drive for the machine is used to drive a roll in the truck and to cause it to act as a take up roll. When the roll in the take up machine in Figure 8 has been filled as desired, it is then transferred to the shearing machine shown in Figure 10, and there it is shown that the member 48 bears the reference character 48a, this differing from 48 only by being bent downward. On account of the adjustment of the truck, the support 48 could be used in this machine by raising the roll upward in alinement with the portion 49. This is merely shown to illustrate that the members 48 and 49 can be varied as to their contour to accommodate the truck to various types of machines. The truck which is now attached to the feed end of the shearer which shearer is broadly indicated by reference character 90, has the cloth run through the rolls in the shearer to the rolls 91 and 92 and beneath the cloth stretcher 93 and on to the roll in the truck which truck is placed at the other end of the device to serve as a take up roll in the same manner as said truck is secured to the other machines shown in the drawings. Secured to the shaft forming a part of roll 91 is a sprocket wheel 94 on which is secured a sprocket chain 95 which in turn is secured to a sprocket 96 on a shaft 97, and on this same shaft is fixedly secured a pulley 98 which has thereon a crossed belt 99 which is secured to the pulley or sprocket, and in this case it would to a pulley to take the place of the sprocket 39 in Figure 3. After the cloth has been passed through the shearer, the truck will be detached from the take up end of the shearer and be rolled to the cloth inspector 100 shown in Figure 11, and there the truck will be detached, though it may be attached if desired, but it has been found by actual experience that it needs no attaching, and the cloth is passed from this roll and fed through the cloth inspecting machine which inspecting machine comprises the supports 101 and 102 for the cloth and also the supports 103 and 104, and then underneath roller, or roll, 105 and across the inspecting table 106 and over a roller 107 onto a take up roll 108, said mechanism being driven by a motor 109. Suitable lights are provided for throwing light upon the cloth there being the housing 110 on each side of the machine for throwing light against the portion 111 of the cloth whereas a housing 112 is provided to have lamps such as a vapor lamp for throwing light onto the portion 113 of the cloth so that defects in the filling may be detected by one source of light and defects in the warp will be detected by another source of light and then the final usual inspection will take place on the table 106.

After this inspecting operation has been completed the cloth may be subjected to various operations in which the truck shown can be used, and it may be subjected to another operation such as inspecting and measuring machine and thereafter it is passed to the dyeing machine 120 indicated in Figure 12. This dyeing machine has the conventional upright braces 113 at the four corners thereof for supporting suitable rollers or supports 114 and 115 and in the conventional dyeing machine, the rollers 115 are generally a take up mechanism driven by the sprocket 116. By the attachment of the truck to each end of this machine the cloth may be passed through the machine first in one direction and then in the other until the dyeing operation has been completed. In order to show how the truck may be used in a dyeing machine, we have shown the gears 116 secured to the end rolls of the machine with a sprocket chain 117 leading to the sprocket 118 on the roll in the truck which sprocket 118 is similar to the sprocket 39 as shown in Figure 3. It is there seen that the cloth can be passed through the dyeing machine first in one direction and then in the other as this dyeing machine has the conventional sprocket 119 and the sprocket 121 on which the sprocket chains 119 are mounted for operation of the rollers for passing the cloth through the machine and this detailed structure will not be gone into as the dyeing machine is conventional.

After the dyeing operation the cloth can be passed through an extractor which is not shown, but in which the truck can be used at both ends thereof similar to the other machines shown in the drawings.

After the extracting operation the cloth is then sometimes passed to the tentering machine shown in Figure 14 which is a conventional tentering machine and is indicated by the reference character 122 which tentering machine has stretching means shown at 123 and a truck 10 with the roll of cloth therein is secured to the feed end and the cloth is passed beneath rollers 124 and over roller 125 and through the tentering or stretching mechanism 123 and onto a truck at the other end which truck has shown thereon a sprocket 39 and the attaching mechanism shown in the other drawings and a sprocket chain 126 is passed over a sprocket 127 secured on the conventional shaft 128 in the tentering machine driving the roll in the truck as a take up mechanism.

After leaving the tentering machine the truck bearing the cloth can be rolled to the feed end of a palmer or button breaker which is not shown in the drawings but the other machines show in the drawings how the mechanism and the truck can be attached at both ends of the palmer or button breaker for operating in association therewith.

The truck bearing a roll of cloth can be attached to a drier as shown in Figure 13 which drier is indicated by the reference character 130 which has a plurality of drying drums 131 and both the feed roll truck and the take up truck are attached by means of the braces 49 and the pipe member 48 as already described for the other machines. The cloth is led from the left hand or feed roll in the truck and between the steam heated cylinders 131 for the drying operation. On one of the shafts supporting the cylinders for rotation is secured a sprocket wheel 132 on which a sprocket chain 133 is mounted which passes over sprocket wheel 39, which has already been described, for the purpose of driving the take-up roll in the truck.

It is evident that pulleys and belts can be used in all places in the drawings instead of sprockets, or any other suitable driving means could be employed.

After the drying operation has been completed, the cloth may be subjected to other processes, or if desired, may be passed on to the calender which is indicated in Figure 16, and it is indicated broadly by the reference character 135, comprising a plurality of rolls 136 and the feed truck and the take-up trucks are secured to this calendar in the same manner as shown in the other drawings and the cloth is passed off the left hand roll in Figure 16 and then between the calender rolls and then onto the roll in the take-up truck, shown as being at the right in Figure 16, and a sprocket or belt 137 is mounted on a sprocket wheel or pulley 138 secured on the shaft supporting one of the calender rolls, and the belt or sprocket is also mounted on the sprocket or pulley 39 on the roll in the take-up truck.

After passing thru the calender, the truck at the right hand end thereof can be detached and moved to the position shown in Figure 17 to pass the cloth into the doubler indicated by the reference character 140 and into the winder 141 where it is broken down as at 142 into the final package form.

In several of the machines shown, due to the fact that the speed of the cloth increases as the diameter of the roll increases as more is put onto the take-up roll, and in the dye machine, where a reverse operation takes place, there must be some means provided for preventing the cloth from being pulled too strongly thru the machine with which the take-up truck is associated, and in Figure 15, there is shown means adapted to be associated with any of said machines for accomplishing the purpose.

In this structure there is shown the shaft, indicated by the reference character 145, but which may be any of the driving shafts in the various machines. In case the shaft is not long enough, an extention may be secured thereto. This shaft has fixedly secured thereon a wheel 148 by means of a set screw 147 secured in integral collar 146. This disk or wheel 148 has cavities 149 therein in which compression springs 152 are mounted which project into similar cavities 151 in wheel 150, which wheel 150 has other cavities therein in which pins 155 are loosely mounted, the other ends of said pins being securely mounted in similar cavities in wheel 148. The disk or wheel 150 is loosely mounted on shaft 145, and also loosely mounted on shaft 145 is a sprocket wheel or pulley 154, the proximate surfaces of this sprocket 154 and the disk 150 have frictional members 155 and 153 secured to their respective wheels or disks. This mechanism is confined on the shaft by a collar 157 secured thereon by set screw 158.

It is thus seen that as the speed of the take-up roll remains constant, the speed of the cloth will increase as the diameter increases, and when too great a pull is exerted on the cloth then the arrangement shown in Figupre 15 will allow slippage.

In case the structure shown in Figure 15 is associated with the dyeing machine, shown in Figure 12, then it is apparent that were not some provision made, that when one roll was wound full and the direction of the cloth was reversed in the machine, that the feed roll would be unwound too fast and the cloth would not be taken into the machine as fast as it was unwound, therefore, the structure shown in Figure 15 would be modified, by discarding the set screw 147 and threading the shaft 145 in reverse directions; that is, shaft on which wheel 116 was mounted would be threaded with a left hand thread and the shaft on which the wheel 116 is mounted at the left hand in Figure 12 would have a right hand thread thereon, while the right hand wheel 116 would have a left hand thread so that when the direction of cloth was reversed the wheel associated with the roll serving as a feed roll would be automatically disconnected from its shaft and the wheel associated with the take-up roll would automatically be connected to its shaft to pull the cloth through the machine.

In the drawings and specification there has been set forth a preferred embodiment of the invention and although specific terms are employed, they are used in a generic and descriptive sense only and not for purposes of limitation, the scope of the invention being set forth in the appended claims.

I claim:

1. A wheeled truck for holding a web supply for a treating machine, comprising a rectangular framework, upwardly and outwardly projecting portions disposed at the four corners of said framework, a caster wheel mounted in each projecting portion, inverted U-shaped members secured to pairs of said projecting members, a vertically disposed member secured to each end of the framework, and a roll member mounted in said vertically disposed members.

2. A web roll truck for handling web rolls adapted to be interchangeably secured to the feed and take-up ends of a web handling machine, comprising a wheeled framework, a pair of vertically adjustable members in said framework, a roll member adapted to support the web and having spindles projecting from each end thereof, bearing members in the upper end of said vertically adjustable members rotatably engaging said spindles, rigid telescopic means secured to the machine at one end having means on their other ends for engaging said spindles for holding the truck in spaced relation to said machine.

3. A web supply truck for web handling machines comprising a wheeled framework and a web roll rotatably mounted in said framework, means for adjusting the web roll vertically in said framework, a pair of rigid arms having one end secured to the machine and the other end engaging the ends of said web roll for holding the web roll and its associated truck in spaced relation from the machine.

4. Cloth handling means for textile machines comprising a wheeled truck adapted to be positioned in spaced relation from the end of a machine, said wheeled truck comprising a framework, a pair of vertically adjustable bearing members in said framework, a web roll member having spindles in the end thereof rotatably mounted in said bearings, telescopic arms having one end secured to the machine and the other end engaging said spindles to permit rotation of spindles in said arms.

5. In combination means for supplying a machine with a web supply and receiving the web therefrom comprising a portable truck having a pair of upwardly extending standards with a hub in the upper ends of the standards, a roll member mounted in said hubs and onto which a web supply is adapted to be wound or unwound, means for adjusting said standards vertically, extensible rigid means secured to each end of the machine at one end and having means for engaging the ends of the roll member on their other ends.

6. Means for treating a web supply for textile machines comprising a plurality of treating machines having pairs of rigid telescopic arms secured at one of their ends to the intake and output ends of the machine, a wheeled truck having a roll member provided with spindles on its ends, vertically adjustable means in said truck in which the spindles are rotatably mounted, means on the outer end of said telescopic arms for releasably engaging said spindles, means driven by the machine for positively engaging some of said spindles for positively driving some of said rolls whereby a truck secured to the out-put end of a machine may be transferred to the in-put end of a succeeding machine for passing the web supply contained on its roll thru the succeeding machine into a similar truck similarly secured to the out-put end of said machine.

7. In a cloth handling textile machine, a take-up mechanism, comprising a wheeled truck with a roll member provided with spindles rotatably mounted therein, rigid extensible means extending from the machine and engaging said spindle for securing said roll member and said truck to the said machine, means for driving said roll member from said machine, means permitting quick detachability of said truck from said machine.

8. In a textile machine, a detachable take-up roll mechanism, comprising a wheeled truck with a roll member rotatably mounted in said truck, extensible telescopic means extending from the machine and engaging the ends of the roll member for detachably connecting said roll member to the take-up end of said machine and means for driving the roll in said truck from said machine.

9. In a textile machine, means for passing cloth therethrough, comprising a wheeled truck having a rotatable and vertically adjustable roll member therein, a pair of extensible telescopic arms on the machine, means for detachably connecting said roll member to the outer end of said arms at the feed end of said machine, means for attaching a similar truck and roll member to the take-up end of said machine and means driven by the machine for driving the take-up roll associated with said machine.

10. In a textile machine, a feed roll mechanism adapted to be associated with said machine, comprising a wheeled truck with a roll member mounted in said truck onto which cloth has been wound, means for detachably securing the truck to said machine comprising extensible telescopic arms secured to the machine at one of their ends and detachably secured to the ends of the roll member at their other ends.

11. Means for passing cloth and the like thru a textile machine comprising wheeled trucks, means for detachably securing one of the wheeled trucks to each end of the machine, each of said wheeled trucks having rotatably mounted therein a roll onto which the cloth is adapted to be wound, means for retarding the movement of the roll in the truck secured to the feed end of the machine, and means driven by the machine for driving the roll in the truck associated with the take-up end of the machine, said securing means comprising a pair of extensible arms extending from each end of the machine, and means for adjusting the roll in the truck to cause its ends to coincide with the ends of a pair of said extensible arms.

12. Means for handling cloth in passing the same thru textile machinery and from one textile machine to another comprising a wheeled truck having a vertically adjustable rotatable roll onto which the cloth is adapted to be wound, means extending from the machine and detachably engaging the ends of the roll for detachably connecting the roll and the wheeled truck to the feed end of a textile machine, means for similarly securing a similar truck to the out-put end of the machine to receive the cloth after it passes thru the machine, friction means for driving the roll in the truck at the out-put end of the machine in unison with said textile machine, said truck being adapted to be detached from the out-put end of said machine and detachably secured to the feed end of the next succeeding machine, and means for retarding the movement of the roll in the truck at the feed end of the machine.

JOHN G. BENTLEY.